United States Patent
VanAmburgh

(10) Patent No.: US 9,346,411 B1
(45) Date of Patent: May 24, 2016

(54) HITCH MOUNTED RACK SYSTEM

(71) Applicant: Peter C. VanAmburgh, Roswell, GA (US)

(72) Inventor: Peter C. VanAmburgh, Roswell, GA (US)

( * ) Notice: Subject to any disclaimer, the term of this patent is extended or adjusted under 35 U.S.C. 154(b) by 0 days.

(21) Appl. No.: 14/492,744

(22) Filed: Sep. 22, 2014

(51) Int. Cl.
*B60R 9/06* (2006.01)
*B60R 9/08* (2006.01)
*B60R 9/12* (2006.01)

(52) U.S. Cl.
CPC ... *B60R 9/06* (2013.01); *B60R 9/08* (2013.01); *B60R 9/12* (2013.01)

(58) Field of Classification Search
CPC .............. B60R 9/06; B60R 9/08; B60R 9/12
USPC .......... 224/488–491, 493–510, 564–566, 924
See application file for complete search history.

(56) References Cited

U.S. PATENT DOCUMENTS

| | | | | |
|---|---|---|---|---|
| 3,260,929 A * | 7/1966 | Hedgepeth | ................ | B60R 9/00 224/321 |
| 3,300,111 A * | 1/1967 | Hedgepeth | ................ | B60R 9/06 224/500 |
| 5,381,939 A | 1/1995 | Tippets | | |
| 5,586,702 A | 12/1996 | Sadler | | |
| 5,649,656 A | 7/1997 | Davy | | |
| 5,820,004 A | 10/1998 | Lane | | |
| 5,938,092 A * | 8/1999 | Johnson | ................... | B60R 9/06 224/405 |
| 6,237,824 B1 * | 5/2001 | Bagley | ...................... | B60R 9/06 224/402 |
| D446,755 S | 8/2001 | Adams et al. | | |
| 6,293,451 B1 | 9/2001 | LeMay et al. | | |
| 6,517,134 B2 * | 2/2003 | Armstrong | ................ | B60P 3/40 224/405 |
| 6,662,983 B2 | 12/2003 | Lane et al. | | |
| 7,066,365 B2 * | 6/2006 | Brown | ...................... | B60R 9/06 224/401 |
| 7,784,657 B2 | 8/2010 | Blakley | | |
| 7,861,903 B2 * | 1/2011 | Plaschka | ................... | B60R 9/06 224/402 |
| D632,635 S | 2/2011 | Farber | | |
| D632,636 S | 2/2011 | Farber | | |
| D632,637 S | 2/2011 | Farber | | |
| D632,638 S | 2/2011 | Farber | | |
| 7,886,948 B2 | 2/2011 | Kerr | | |
| 8,430,286 B1 * | 4/2013 | Patrick | ...................... | B60R 9/00 224/310 |
| 2005/0205630 A1 | 9/2005 | Cooper et al. | | |
| 2010/0213226 A1 * | 8/2010 | Gray | ......................... | B60P 3/10 224/400 |
| 2012/0193380 A1 | 8/2012 | McMurtrie | | |

* cited by examiner

*Primary Examiner* — Gary Elkins
(74) *Attorney, Agent, or Firm* — Shaddock Law Group, PC

(57) ABSTRACT

A hitch mounted rack system having a lower base unit that includes a hitch beam and a hitch beam vertical support extending from the hitch beam; a cantilevered upper base unit that includes a support beam and a support beam vertical support extending from the support beam, and wherein the support beam vertical support is at least partially received within the hitch beam vertical support; a center-point adjustable sleeve that is adjusted in relation to the hitch beam vertical support and the support beam vertical support; and one or more crossbar assemblies positioned along the support beam.

19 Claims, 15 Drawing Sheets

HITCH MOUNTED RACK SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to the field of vehicle accessories. More specifically, the present invention relates to a hitch mounted rack system.

2. Description of Related Art

It is generally known to attach various platforms for carriers, such as, for example, cargo platforms and bicycle carriers to a vehicle using the vehicle tow hitch. Such platforms or carriers are typically attached to the vehicle tow hitch and extend from the rear of the vehicle to provide additional space for carrying various items, especially items that are too large to fit within the interior of the vehicle.

It is also generally known to attach or support various items or brackets to the roof of a vehicle. Roof racks allow items to be carried above the vehicle.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

However, the typical vehicle hitch mounted brackets and rack systems have various shortcomings. By extending from the rear of the vehicle, typical each mounted brackets and rack systems extend the length of the vehicle and can make it difficult for drivers to park or backup the vehicle without difficulty. A major shortcoming in single post design is left/right and fore/aft movement of the rack system. Another major shortcoming is that hitch-mounted rack systems typically provide for a single crossbar (see, for example, U.S. Pat. No. 5,649,656 to Davy, entitled Receiver Hitch Boat and Canoe Rack) requiring another support point on the vehicle.

If a vehicle includes a spare tire, it can be impossible to use a known hitch mounted bracket or rack system, as the tire occupies too much of the space adjacent the vehicle tow hitch.

When items are placed on a roof rack, unwanted weight and stress can be placed upon the vehicle roof. Additionally, roof racks cannot typically be used with soft-top or convertible vehicles.

The present invention provides a vehicle hitch mounted rack system that overcomes the shortcomings of known hitch mounted rack systems and provides a hitch mounted rack system or rack system that can be used with soft-top vehicles, does not appreciably extended the length of the vehicle, and can be used with an externally mounted spare tire.

The present invention differs from other hitch-mounted cargo systems by providing a cantilevered horizontal rack system elevated above the roof of the vehicle. As noted above, the cantilever design provides two crossbars for attaching/securing gear. Additionally, a strap system is employed to specifically address movement of the vertical structure of the rack both laterally as well as forward and rearward. In various exemplary, nonlimiting embodiments, the strap system is capable of connecting the hitch mounted rack system to both the vehicle's bumper as well as an externally mounted spare tire. Thus, the present invention allows the carrying of kayaks, stand-up paddleboards, bicycles, other sporting cargo, and building materials such as lumber, ladders, and piping elevated over the roofline of the vehicle.

In various exemplary, non-limiting embodiments, the hitch mounted rack system of the present invention comprises a lower base unit that engages the vehicles towing hitch and acts as a vertical support frame, an upper base unit that serves as a horizontal support frame, crossbar assemblies for suspending loads, and a center-point adjustable sleeve. The rack system also includes a set of straps to limit movement of the horizontal and vertical frames when attached to the vehicle. A hitch connection is provided at the lower end of the lower base unit. The lower base unit serves as the vertical support frame for the upper base unit. The upper base unit is cantilevered over the vehicle to provide an elevated rack system above the roof of the vehicle.

Accordingly, the presently disclosed invention provides a hitch mounted rack system that allows items to be transported above a vehicle.

The presently disclosed invention separately provides a hitch mounted rack system that can be used with soft-top vehicles.

The presently disclosed invention separately provides a hitch mounted rack system that can be used with vehicles having an externally mounted spare tire.

The presently disclosed invention separately provides a hitch mounted rack system that can be easily installed and uninstalled by a user.

These and other aspects, features, and advantages of the present invention are described in or are apparent from the following detailed description of the exemplary, non-limiting embodiments of the present invention and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

Any benefits, advantages, or solutions to problems that are described herein with regard to specific embodiments are not intended to be construed as a critical, required, or essential feature(s) or element(s) of the present invention or the claims.

BRIEF DESCRIPTION OF THE SEVERAL VIEWS OF THE DRAWINGS

As required, detailed exemplary embodiments of the present invention are disclosed herein; however, it is to be understood that the disclosed embodiments are merely exemplary of the invention that may be embodied in various and alternative forms, within the scope of the present invention. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein.

DETAILED DESCRIPTION OF THE INVENTION

Figure 1:
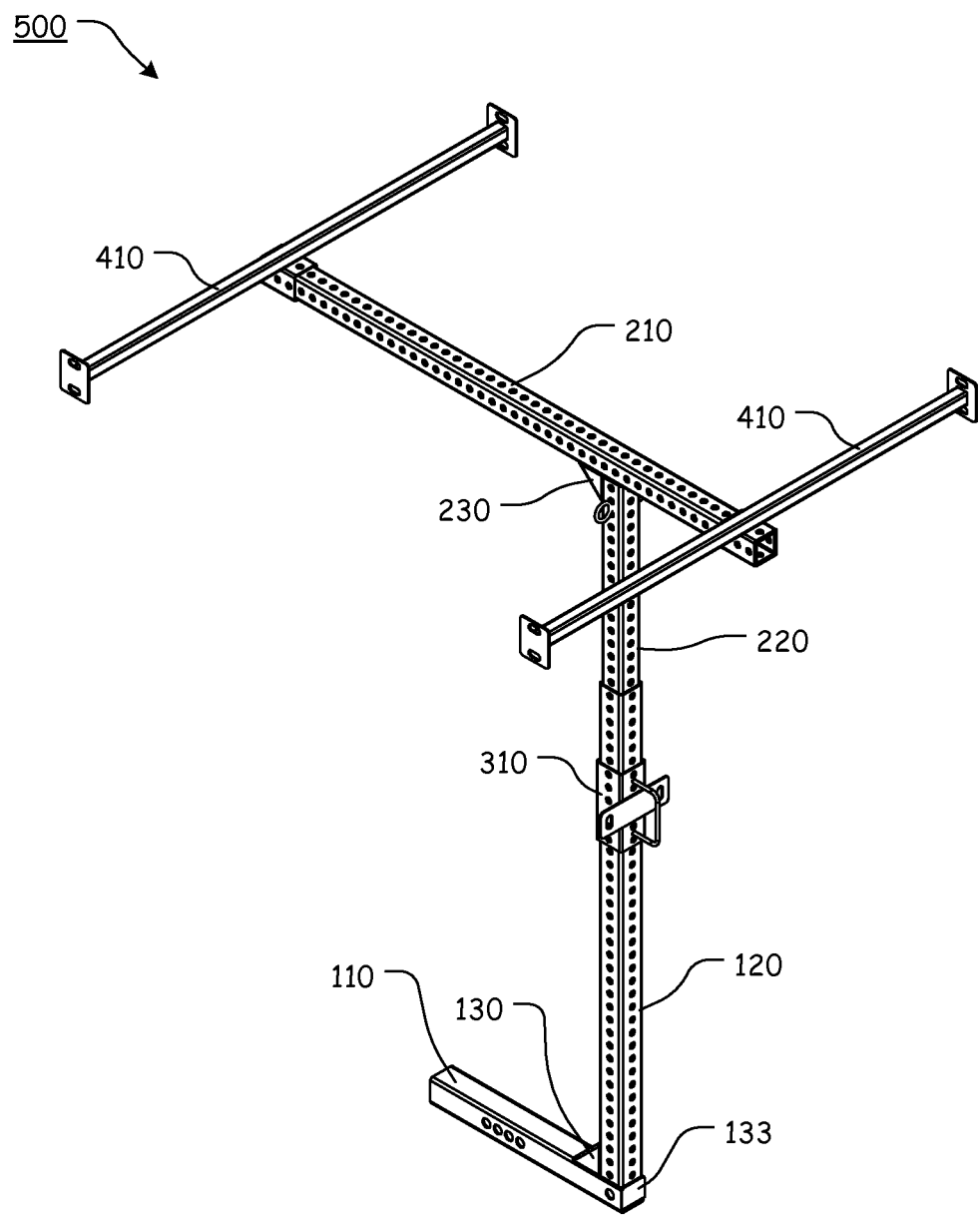
FIG. 1 illustrates a perspective view of a first exemplary embodiment of the hitch mounted rack system, according to this invention.
Figure 2:
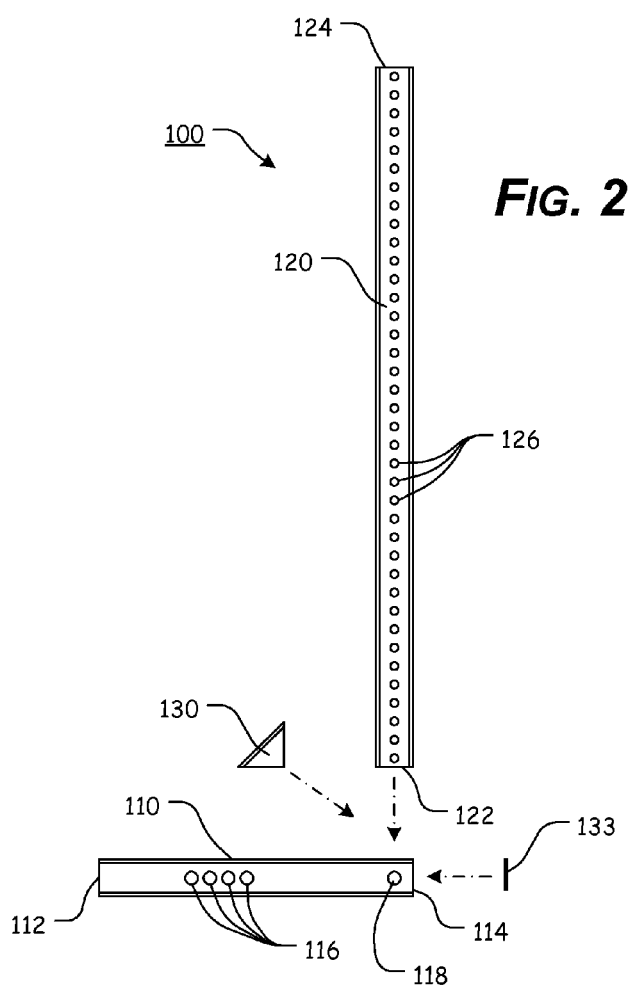
FIG. 2 illustrates a more detailed, exploded view of the components of the lower base unit of an exemplary embodiment of the hitch mounted rack system, according to this invention.
Figure 3:
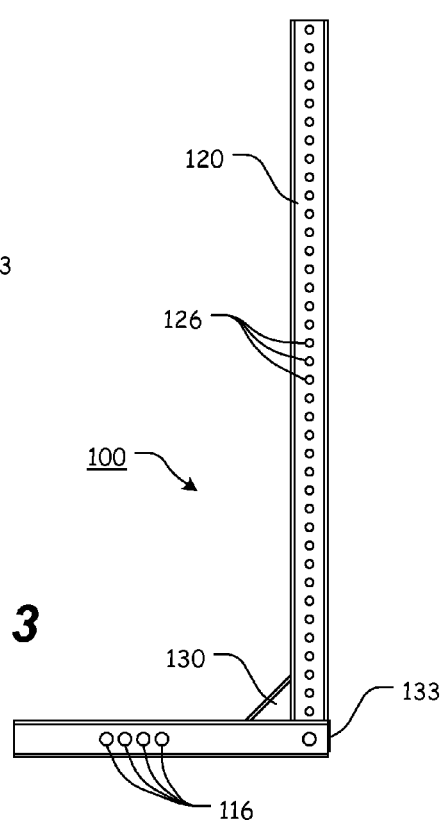
FIG. 3 illustrates a more detailed view of the assembled components of the lower base unit of an exemplary embodiment of the hitch mounted rack system, according to this invention.
Figure 4:
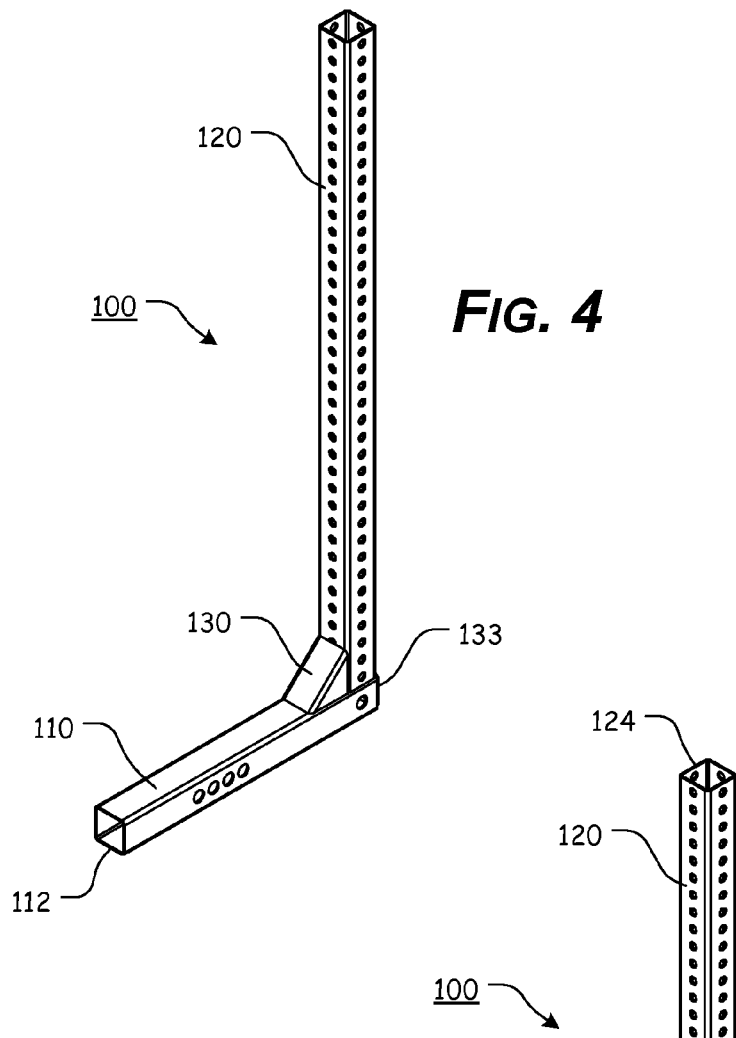
FIG. 4 illustrates a front perspective view of the assembled components of the lower base unit of an exemplary embodiment of the hitch mounted rack system, according to this invention.
Figure 5:
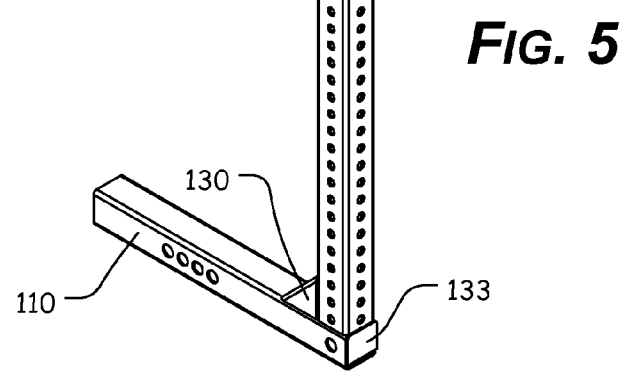
FIG. 5 illustrates a rear perspective view of the assembled components of the lower base unit of an exemplary embodiment of the hitch mounted rack system, according to this invention.
Figure 6:
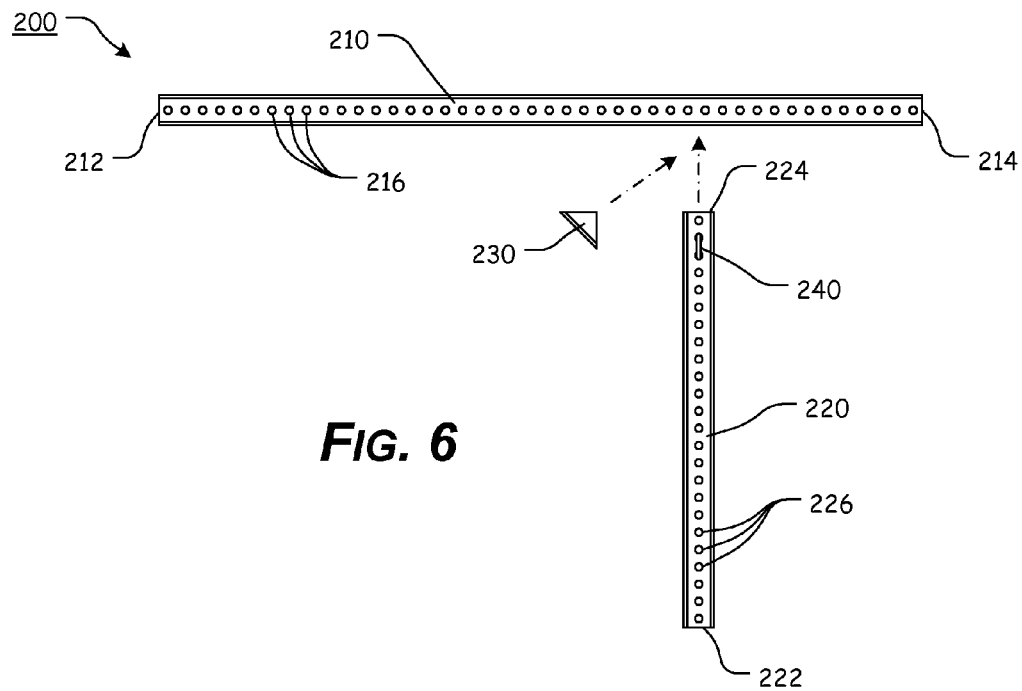
FIG. 6 illustrates a side, exploded view of the components of the upper base unit of an exemplary embodiment of the hitch mounted rack system, according to this invention.
Figure 7:
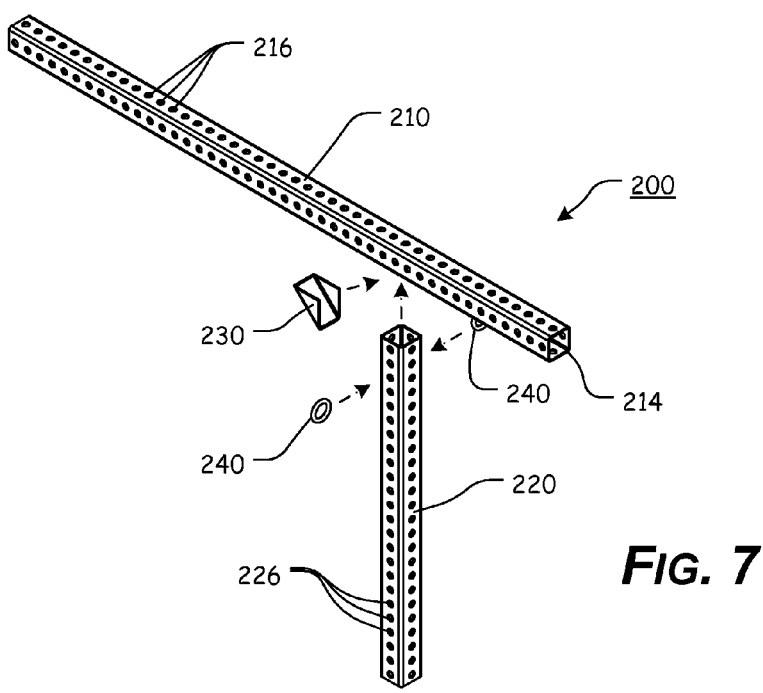
FIG. 7 illustrates a perspective, exploded view of the components of the upper base unit of an exemplary embodiment of the hitch mounted rack system, according to this invention.
Figure 8:
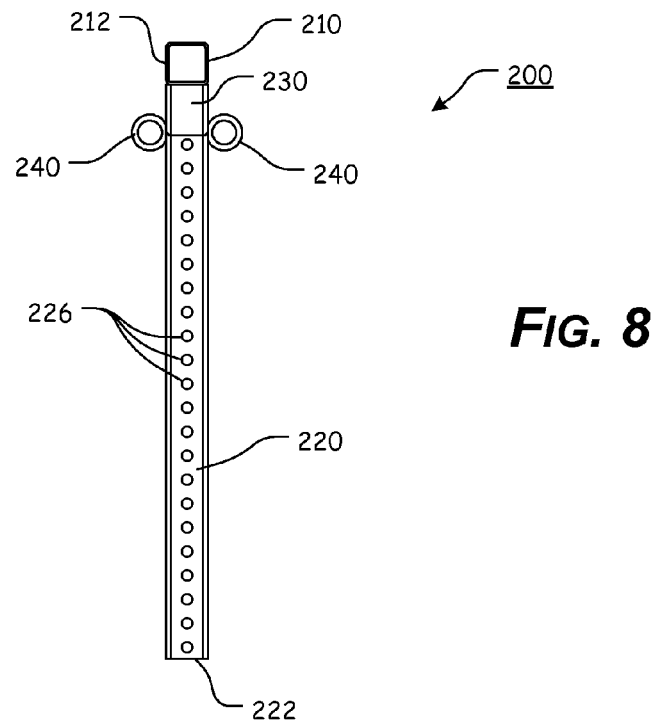
FIG. 8 illustrates a front view of the assembled components of the upper base unit of an exemplary embodiment of the hitch mounted rack system, according to this invention.
Figure 9:
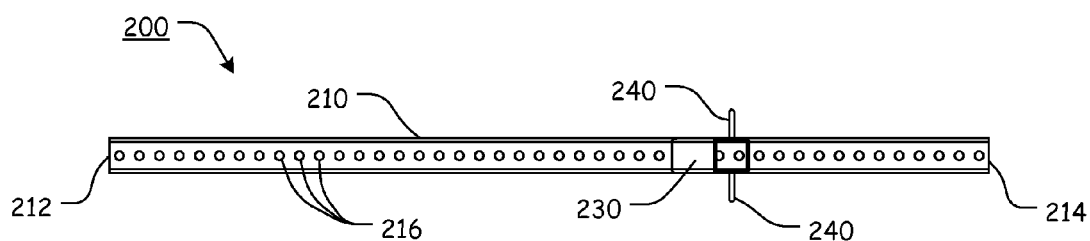
FIG. 9 illustrates a bottom view of the assembled components of the upper base unit of an exemplary embodiment of the hitch mounted rack system, according to this invention.
Figure 10:
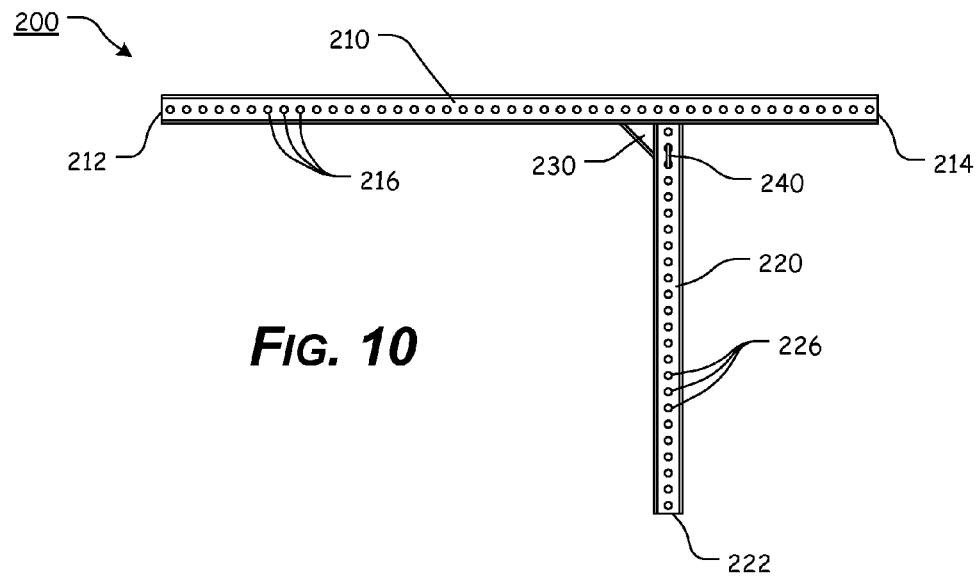
FIG. 10 illustrates a right side view of the assembled components of the upper base unit of an exemplary embodiment of the hitch mounted rack system, according to this invention.
Figure 11:
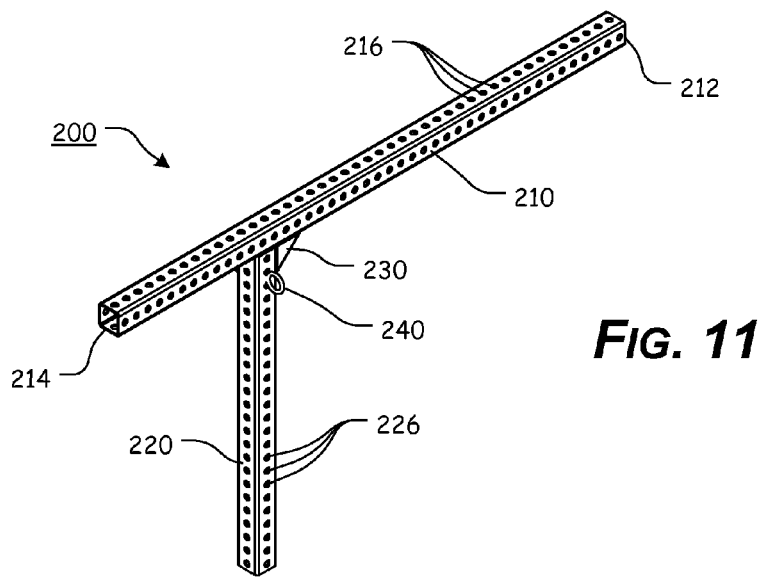
FIG. 11 illustrates a left, rear perspective view of the assembled components of the upper base unit of an exemplary embodiment of the hitch mounted rack system, according to this invention.
Figure 12:
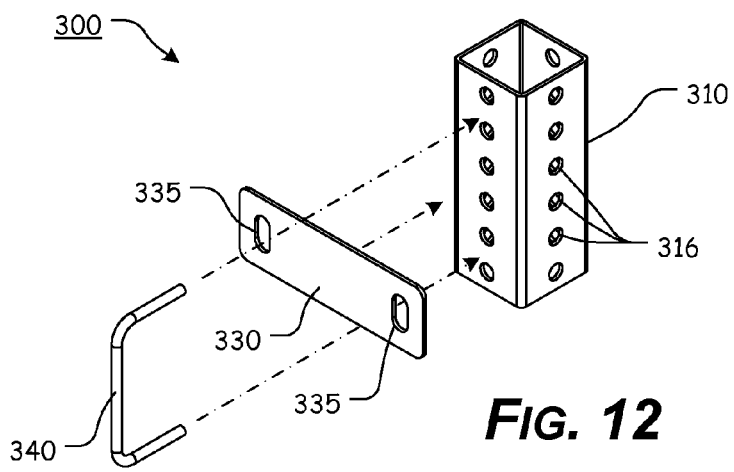
FIG. 12 illustrates an exploded, perspective view of the various components of the center-point adjustable sleeve of an exemplary embodiment of the hitch mounted rack system, according to this invention.
Figure 13:
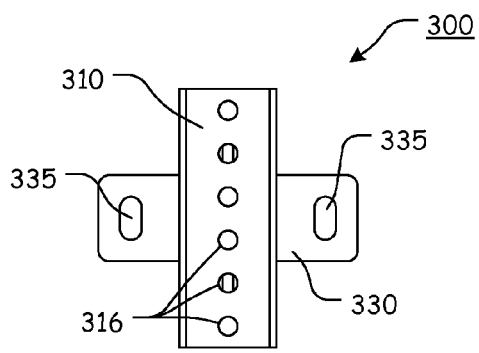
FIG. 13 illustrates a front view of the assembled components of the center-point adjustable sleeve of an exemplary embodiment of the hitch mounted rack system, according to this invention.
Figure 14:
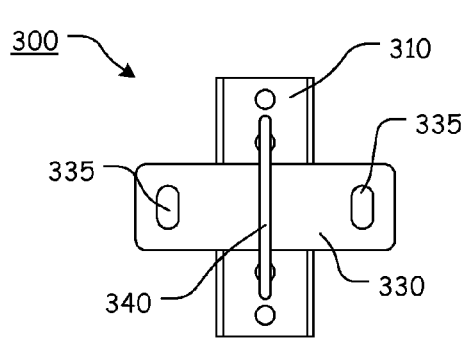
FIG. 14 illustrates a rear view of the assembled components of the center-point adjustable sleeve of an exemplary embodiment of the hitch mounted rack system, according to this invention.
Figure 15:
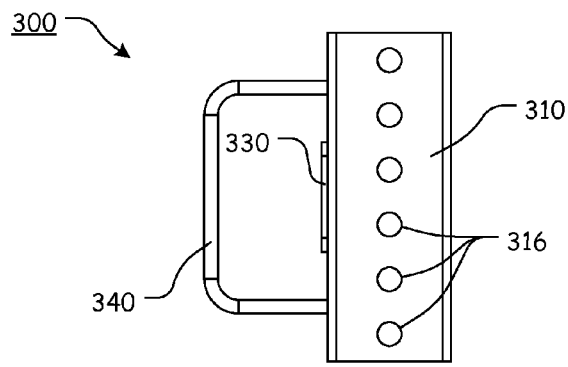
FIG. 15 illustrates a right, side view of the assembled components of the center-point adjustable sleeve of an exemplary embodiment of the hitch mounted rack system, according to this invention.
Figure 16:
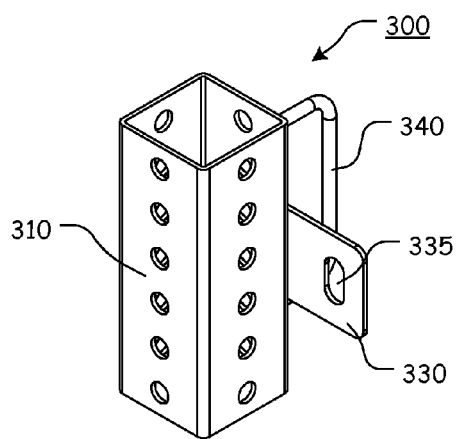
FIG. 16 illustrates a front, perspective view of the assembled components of the center-point adjustable sleeve of an exemplary embodiment of the hitch mounted rack system, according to this invention.
Figure 17:
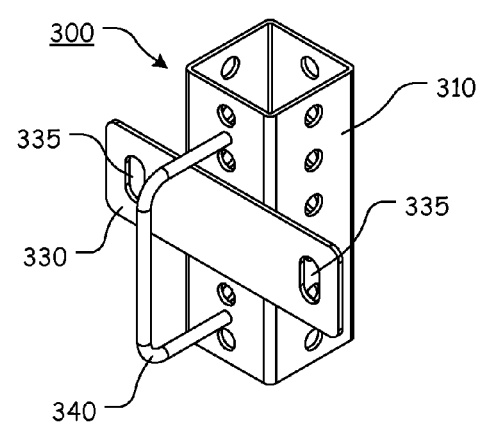
FIG. 17 illustrates a rear, perspective view of the assembled components of the center-point adjustable sleeve of an exemplary embodiment of the hitch mounted rack system, according to this invention.
Figure 18:
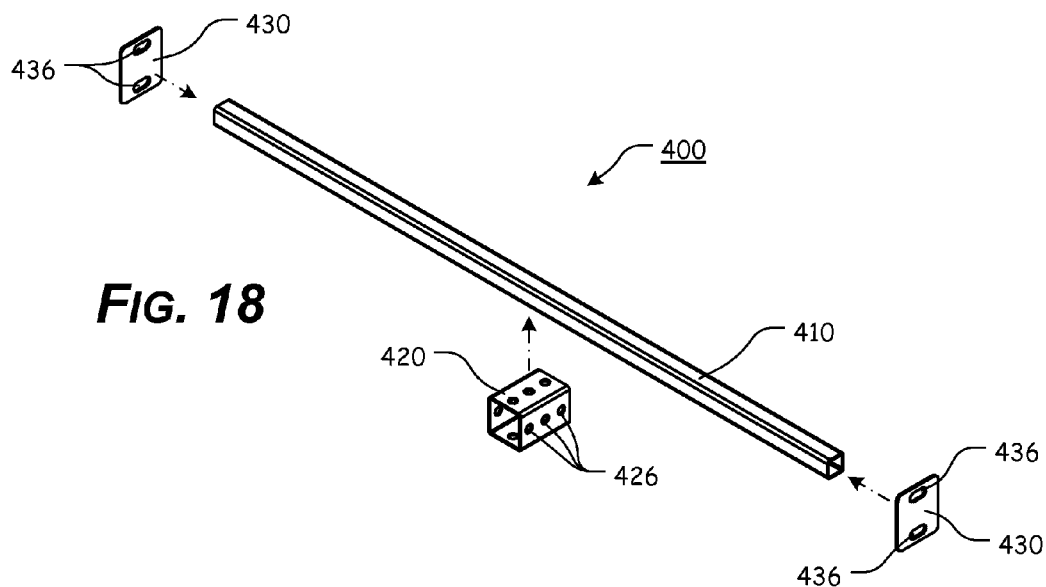
FIG. 18 illustrates an exploded, perspective view of the various components of the crossbar assembly of an exemplary embodiment of the hitch mounted rack system, according to this invention.
Figure 19:
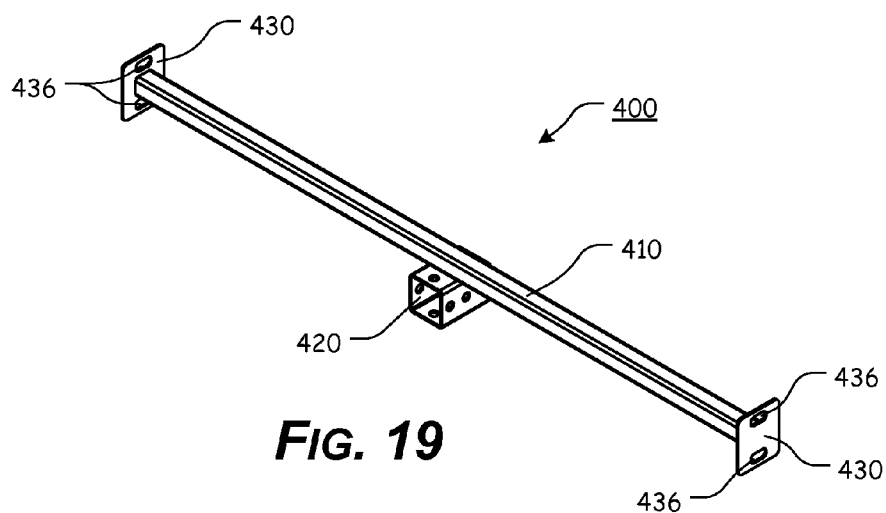
FIG. 19 illustrates a perspective view of the assembled components of the crossbar assembly of an exemplary embodiment of the hitch mounted rack system, according to this invention.
Figure 20:
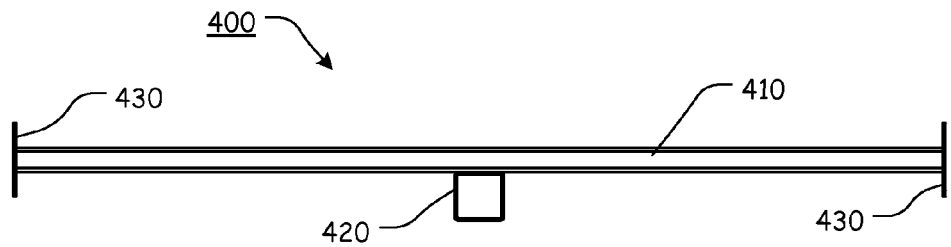
FIG. 20 illustrates a front view of the assembled components of the crossbar assembly of an exemplary embodiment of the hitch mounted rack system, according to this invention.
Figure 21:
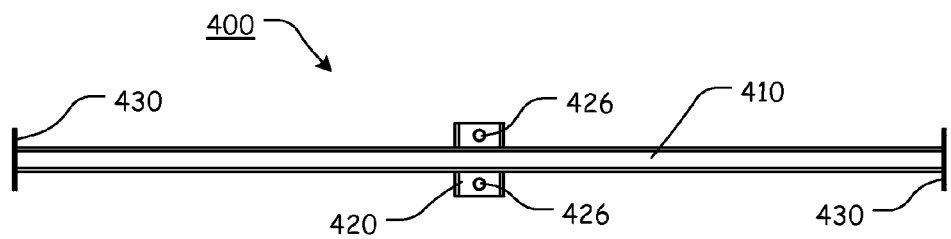
FIG. 21 illustrates a top view of the assembled components of the crossbar assembly of an exemplary embodiment of the hitch mounted rack system, according to this invention.
Figure 22:
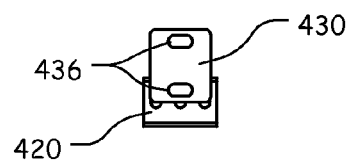
FIG. 22 illustrates a side view of the assembled components of the crossbar assembly of an exemplary embodiment of the hitch mounted rack system, according to this invention.
Figure 23:
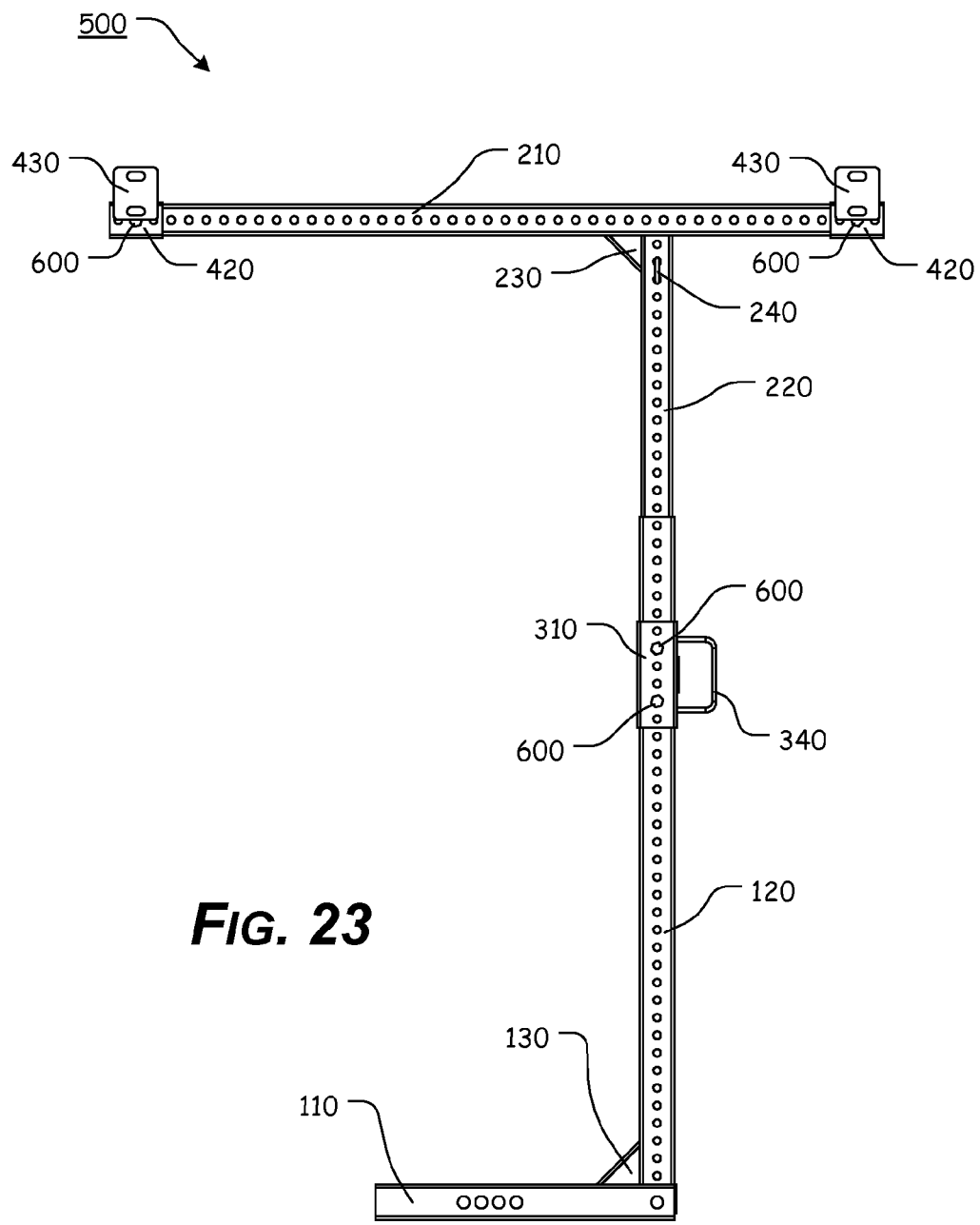
FIG. 23 illustrates a side view of the assembled components of the rack system of an exemplary embodiment of the hitch mounted rack system, according to this invention.
Figure 24:
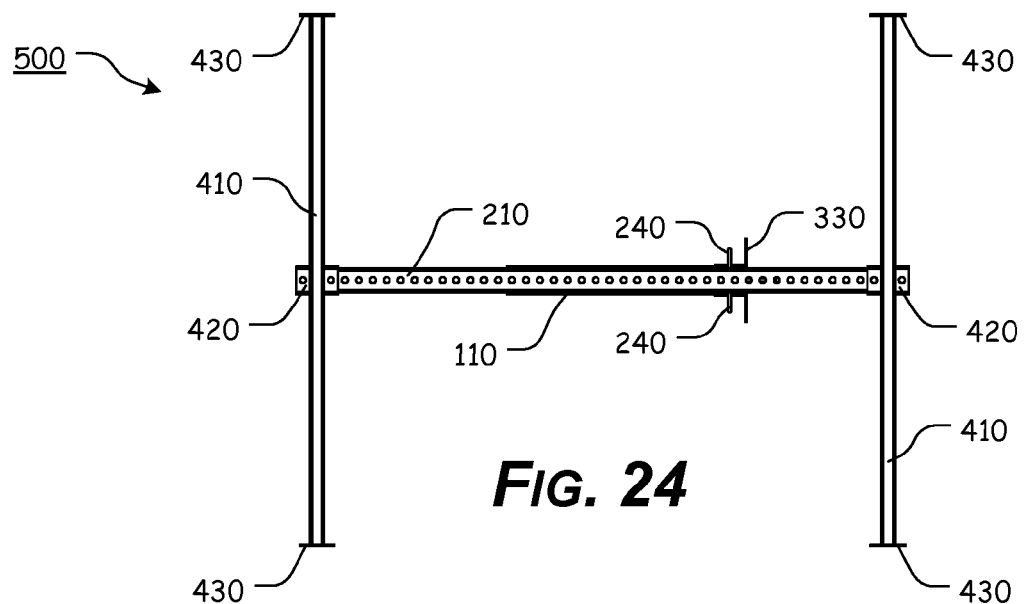
FIG. 24 illustrates a top view of the assembled components of the rack system of an exemplary embodiment of the hitch mounted rack system, according to this invention.
Figure 25:
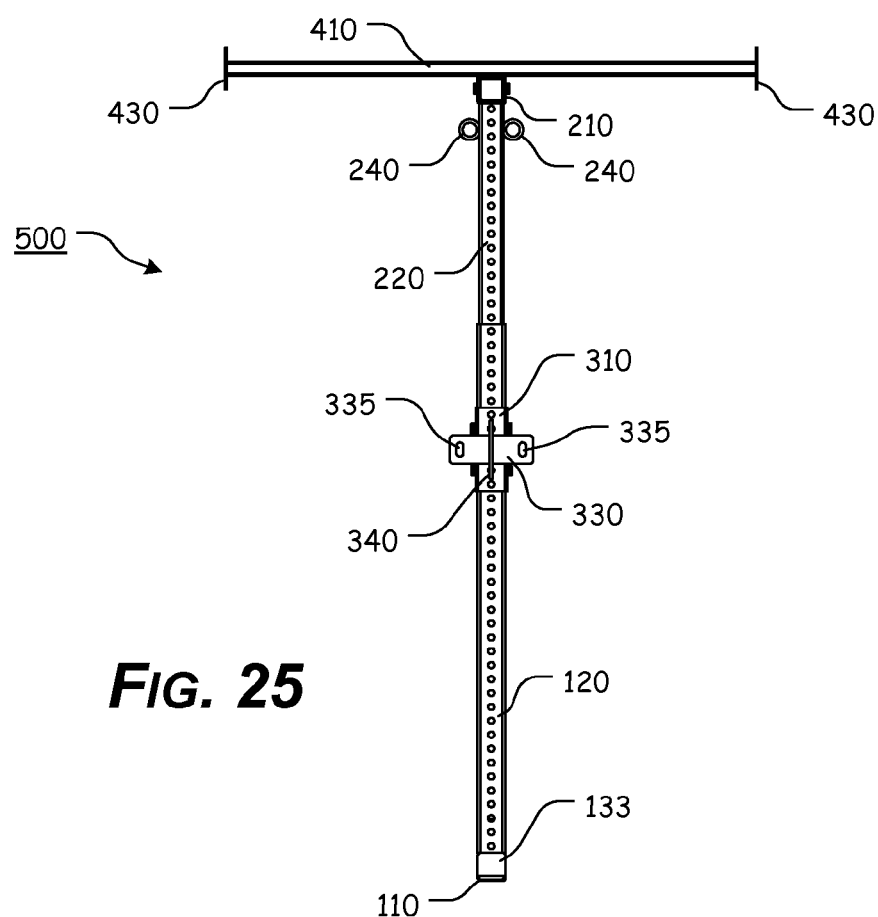
FIG. 25 illustrates a rear view of the assembled components of the rack system of an exemplary embodiment of the hitch mounted rack system, according to this invention.
Figure 26:
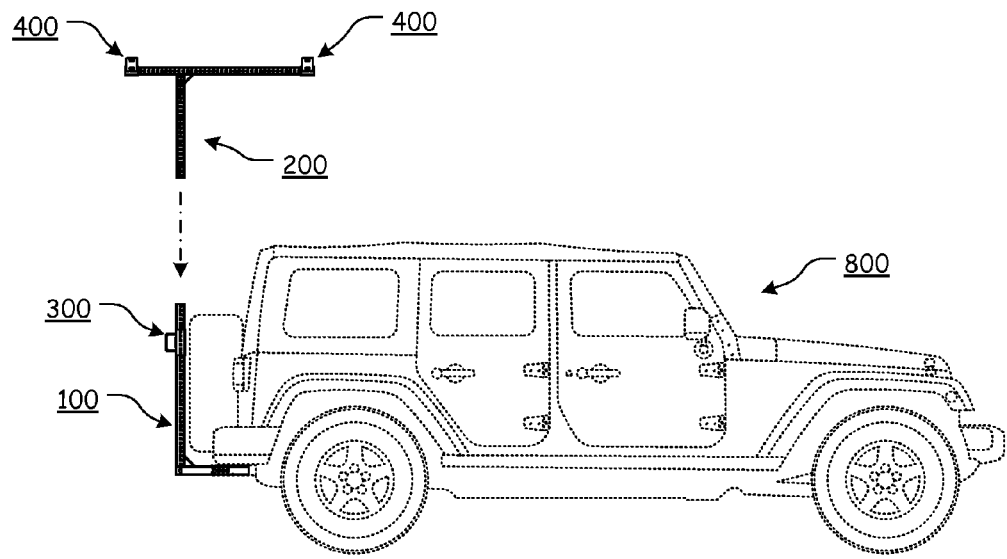
FIG. 26 illustrates a side view of the rack system of an exemplary embodiment of the hitch mounted rack system being installed on an exemplary vehicle, according to this invention.
Figure 27:
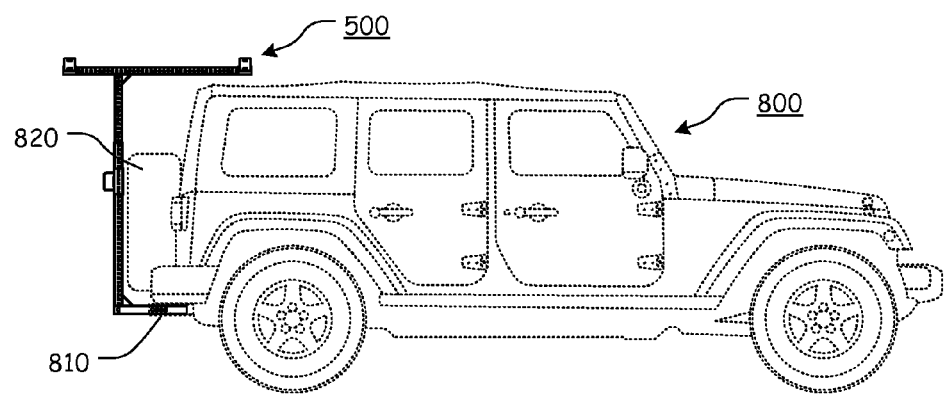
FIG. 27 illustrates a side view of the rack system of an exemplary embodiment of the hitch mounted rack system partially installed on an exemplary vehicle, according to this invention.
Figure 28:
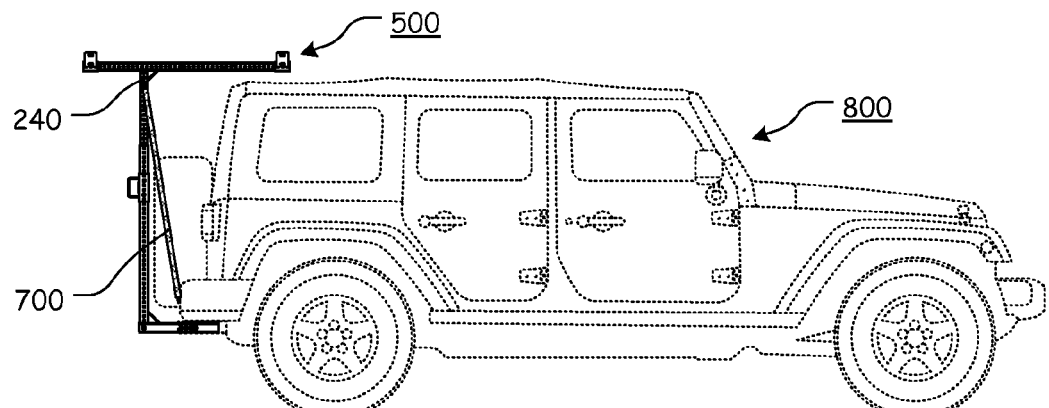
FIG. 28 illustrates a side view of the rack system of an exemplary embodiment of the hitch mounted rack system installed on an exemplary vehicle, according to this invention.
Figure 29:
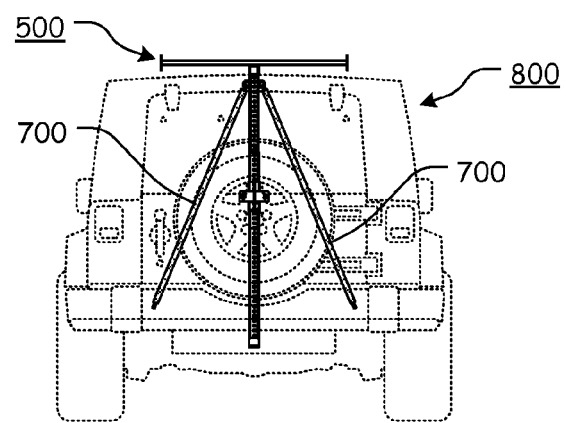
FIG. 29 illustrates a rear view of the rack system of an exemplary embodiment of the hitch mounted rack system partially installed on an exemplary vehicle, according to this invention.

For simplicity and clarification, the design factors and operating principles of the hitch mounted rack system according to this invention are explained with reference to various exemplary embodiments of a hitch mounted rack system according to this invention. The basic explanation of the design factors and operating principles of the rack system is applicable for the understanding, design, and operation of the rack system of this invention. It should be appreciated that the hitch mounted rack system can be adapted to many applications where a hitch mounted rack system can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the elements such terms describe. Thus, these terms are not necessarily intended to indicate temporal or other prioritization of such elements.

Throughout this application the terms "comprise", "have", "include", or "contains" may be used. The terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are open-ended linking verbs. As a result, a system, device, or apparatus that "comprises", "has", "includes", or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations. Thus, it will be understood that these terms are meant to imply the inclusion of a stated element, integer, step, or group of elements, integers, or steps, but not the exclusion of any other element, integer, step, or group of elements, integers, or steps.

It should also be appreciated that the terms "hitch mounted rack system", "rack system", "hitch mounted", and "vehicle" are used for basic explanation and understanding of the operation of the systems, methods, and apparatuses of this invention. Therefore, the terms "hitch mounted rack system", "rack system", "hitch mounted", and "vehicle" are not to be construed as limiting the systems, methods, and apparatuses of this invention.

For simplicity and clarification, the hitch mounted rack system of this invention will be described as being used in conjunction with a Jeep® (Jeep® is a registered trademark of Chrysler Group LLC) having an externally installed spare tire. However, it should be appreciated that these are merely exemplary embodiments of the hitch mounted rack system and are not to be construed as limiting this invention. Thus, the hitch mounted rack system of this invention may be utilized in conjunction with any vehicle having a tow hitch and can be used with or without an externally installed spare tire.

Turning now to the drawing FIGS., FIGS. 1-29 illustrate certain elements and/or aspects of a first exemplary embodiment of the hitch mounted rack system, according to this invention. In illustrative, non-limiting embodiment(s) of this invention, as illustrated in FIGS. 1-29, the hitch mounted rack system 500 comprises a lower base unit 100, an upper base unit 200, a center-point adjustable sleeve 300, crossbar assemblies 400, and support straps 700.

As illustrated most clearly in FIGS. 1-5, the lower base unit 100 includes a hitch beam 110, a hitch beam vertical support 120, and a hitch beam reinforcing corner 130. The hitch beam 110 comprises an elongate portion of material extending from a first end 112 to a second end 114. Typically, the hitch beam 110 (and at least a portion of the first end 112) comprises a portion of square, tubular material sized so as to be at least partially received within a vehicle tow hitch receiver tube 810. Alternatively, the hitch beam 110 may comprise a portion of square, solid material. In various exemplary embodiments, the exterior dimension of each side of the hitch beam 110 is 2 inches. Alternatively, the exterior dimension of each side of the hitch beam 110 may be 1¼ inch to 2½ inches.

One or more hitch beam apertures 116 are formed through the hitch beam 110 so as to be aligned with the hitch pin aperture of a vehicle tow hitch receiver tube 810. The hitch beam apertures 116 allows the distance that the hitch beam 110 is received within a vehicle tow hitch receiver tube 810 to be adjusted and maintained when a hitch pin is positioned through the hitch pin apertures and the appropriately determined hitch beam aperture 116.

The hitch beam vertical support 120 comprises an elongate portion of tubular or at least partially tubular material extending from a first end 122 to a second end 124. Typically, the hitch beam vertical support 120 comprises a portion of square, tubular material of a similar size to that of the hitch beam 110.

The hitch beam vertical support 120 includes a plurality of hitch beam vertical support apertures 126 formed therethrough. In various exemplary embodiments, a longitudinal axis of each hitch beam vertical support aperture 126 is perpendicular to a longitudinal axis of the hitch beam vertical support 120. The hitch beam vertical support apertures 126 allow the center-point adjustable sleeve 300 to be adjustably positioned along the hitch beam vertical support 120, at a desired position, as described below.

In various exemplary embodiments, the first end 122 of the hitch beam vertical support 120 is permanently attached or coupled to the hitch beam 110 proximate the second end 114 of the hitch beam 110, such that a longitudinal axis of the hitch beam 110 is substantially perpendicular to a longitudinal axis of the hitch beam vertical support 120. Typically, the hitch beam vertical support 120 is coupled to the hitch beam 110 by welding. However, it should be appreciated that the hitch beam vertical support 120 may be permanently or removably coupled to the hitch beam 110 by any desired method or device, such as, for example, by fasteners.

In certain exemplary, nonlimiting embodiments, a hitch beam reinforcing corner 130 is attached or coupled so as to join at least a portion of the hitch beam 110 to the hitch beam vertical support 120 in order to provide additional rigidity to the coupled hitch beam 110 and the hitch beam vertical support 120.

A cap plate 133 may optionally be attached or coupled to the second end 114 of the hitch beam 110. In various exemplary embodiments, the plate 133 provides a decorative cover to the hitch beam 110. If the hitch beam 110 is hollow, the plate 133 also keeps debris or material from entering into an interior cavity of the hitch beam 110.

Once assembled, the lower base unit 100 is capable of engaging a vehicle tow hitch receiver tube 810 and acting as a vertical support frame for the rack system 500.

As illustrated most clearly in FIGS. 6-11, the upper base unit 200 includes a support beam 210, a support beam vertical support 220, a support beam reinforcing corner 230, and loops 240. The support beam 210 comprises an elongate portion of material extending from a first end 212 to a second end 214. Typically, the support beam 210 comprises a portion of square, tubular material sized so as to be at least partially received within at least a portion of the hitch beam vertical support 120. In various exemplary embodiments, the exterior dimension of each side of the support beam 210 is 1¾ inches. Alternatively, the exterior dimension of each side of the support beam 210 may be 1¼ inch to 2½ inches.

A plurality of support beam apertures 216 are formed through the support beam 210 so as to be aligned with the crossbar sleeve apertures 426 of the crossbar assembly 400. The plurality of support beam apertures 216 allows the position of the crossbar assemblies 400 to be adjusted in relation to the support beam 210 and maintained in a desired position when one or more pins or bolts 600 is positioned through aligned, corresponding support beam apertures 216 and crossbar sleeve apertures 426.

The support beam vertical support 220 comprises an elongate portion of tubular or at least partially tubular material extending from a first end 222 to a second end 224. Typically, the support beam vertical support 220 comprises a portion of square, tubular material of a similar size to that of the support beam 210.

In various exemplary embodiments, the exterior dimension of each side of the support beam vertical support 220 is 1¾ inches. However, it should be understood that the support beam vertical support 220 is sized so as to be at least partially received within an interior of the hitch beam vertical support 120. In this manner the upper base unit 200 is slidably adjustable with respect to the lower base unit 100 for various heights.

The support beam vertical support 220 includes a plurality of support beam vertical support apertures 226 formed therethrough. In various exemplary embodiments, a longitudinal axis of each support beam vertical support aperture 226 is perpendicular to a longitudinal axis of the support beam vertical support 220. The support beam vertical support apertures 226 allow the center-point adjustable sleeve 300 to be adjustably positioned along the hitch beam vertical support 120, at a desired position, as described below.

In various exemplary embodiments, the second end 224 of the support beam vertical support 220 is permanently attached or coupled to the support beam 210 at a location between the first end 212 and the second end 214, such that a longitudinal axis of the support beam 210 is substantially perpendicular to a longitudinal axis of the support beam vertical support 220. In various exemplary embodiments, a second end 224 of the support beam vertical support 220 is permanently attached or coupled at a location proximate the second end 214 of the support beam 210. Typically, the support beam vertical support 220 is coupled to the support beam 210 by welding. However, it should be appreciated that the support beam vertical support 220 may be permanently or removably coupled to the support beam 210 by any desired method or device, such as, for example, by fasteners.

In certain exemplary, nonlimiting embodiments, a support beam reinforcing corner 230 is attached or coupled so as to join at least a portion of the support beam 210 to the support beam vertical support 220 in order to provide additional rigidity to the coupled support beam 210 and the support beam vertical support 220. However, it should be appreciated that the support beam reinforcing corner 230 may be permanently or removably coupled to so as to join at least a portion of the support beam 210 to the support beam vertical support 220 by any desired method or device, such as, for example, by fasteners.

Loops 240 are permanently or removably attached or coupled to opposing right and left sides of the support beam vertical support 220, proximate the second end 224. The loops 240 provide attachment points for the support straps 700.

Once assembled, the upper base unit 200 serves as a horizontal support frame for the rack system 500.

As illustrated most clearly in FIGS. 12-17, the center-point adjustable sleeve 300 includes a sleeve 310, an adjustment plate 330, and a handle 340. The sleeve 310 comprises an elongate portion of material extending from a first end to a second end. Typically, the sleeve 310 comprises a portion of square, tubular material sized so as to receive at least a portion of the hitch beam vertical support 120 within the sleeve 310. In this manner, the sleeve 310 is slidable along at least a portion of the hitch beam vertical support 120.

A plurality of sleeve apertures 316 are formed through the sleeve 310 so as to be aligned with the hitch beam vertical support apertures 126 and the support beam vertical support apertures 226. The plurality of sleeve apertures 316 allows the position of the sleeve 310 to be adjusted in relation to the hitch beam vertical support 120 and the support beam vertical support 220 and maintained in a desired position when one or more pins or bolts 600 is positioned through aligned, corresponding sleeve apertures 316, hitch beam vertical support apertures 126, and support beam vertical support apertures 226.

In various exemplary embodiments, the adjustment plate 330 is permanently attached or coupled to the sleeve 310 at a location between the first end and the second end. Typically, the adjustment plate 330 is coupled to the sleeve 310 by welding. However, it should be appreciated that the adjustment plate 330 may be permanently or removably coupled to the sleeve 310 by any desired method or device, such as, for example, by fasteners.

The adjustment plate 330 includes a first adjustment plate aperture 335 formed through the adjustment plate 330 proximate the first end and a second adjustment plate aperture 335 formed through the adjustment plate 330 proximate the second end.

In certain exemplary, nonlimiting embodiments, the handle 340 is permanently attached or coupled, such as by welding, to the sleeve 310 at a location between the first end and the second end.

As illustrated most clearly in FIGS. 18-22, the crossbar assemblies 400 includes a crossbar sleeve 420, a crossbar 410, and a crossbar end plate 430. The crossbar sleeve 420 comprises an elongate portion of material extending from a first end to a second end. Typically, the crossbar sleeve 420 comprises a portion of square, tubular material sized so as to receive at least a portion of the support beam 210 within the crossbar sleeve 420. In this manner, the crossbar sleeve 420 is slidable along at least a portion of the support beam 210.

A plurality of crossbar sleeve apertures 426 are formed through the crossbar sleeve 420 so as to be aligned with the support beam apertures 216. The plurality of crossbar sleeve apertures 426 allows the position of the crossbar sleeve 420 to be adjusted in relation to the support beam 210 and maintained in a desired position when one or more pins or bolts 600 is positioned through aligned, corresponding crossbar sleeve apertures 426 and support beam apertures 216.

The crossbar 410 comprises an elongate portion of material and is permanently attached or coupled, such as by welding, to the crossbar sleeve 420 at a location proximate the center of the crossbar 410. A longitudinal axis of the crossbar sleeve 420 is perpendicular to a longitudinal axis of the crossbar 410. However, it should be appreciated that each crossbar 410 may be permanently or removably coupled to crossbar sleeve 420 by any desired method or device, such as, for example, by fasteners.

In various exemplary embodiments, a crossbar end plate 430 is permanently attached or coupled to each end of the crossbar 410. In various exemplary embodiments, each crossbar end plate 430 is permanently coupled to the crossbar 410, such as by welding. However, it should be appreciated that each crossbar end plate 430 may be permanently or removably coupled to the crossbar 410 by any desired method or device, such as, for example, by fasteners.

Each crossbar end plate 430 includes at least one crossbar plate aperture 436 formed therethrough.

In various exemplary embodiments, certain components of the rack system 500 are substantially rigid and are formed of steel. Alternate materials of construction of the various components of the rack system 500 may include one or more of the following: stainless steel, aluminum, titanium, and/or other metals, various alloys and composites thereof, and/or various combinations of the foregoing. Thus, it should be understood that the material or materials used to form the various components of the rack system 500 is a design choice based on the desired appearance and functionality of the rack system 500.

It should be appreciated that certain elements of the rack system 500 may be formed as an integral unit (such as, for example, the hitch beam 110 and the hitch beam vertical support 120 and the support beam 210 and the support beam vertical support 220). Alternatively, suitable materials can be used and sections or elements made independently and attached or coupled together, such as by adhesives, welding, screws, rivets, pins, or other fasteners, to form the various elements of the rack system 500.

It should also be understood that the overall size and shape of the rack system 500, and the various portions thereof, is a design choice based upon the desired functionality and/or appearance of the rack system 500.

The rack system 500 also includes a set of support straps 700 that can be attached to the loops 240 to limit movement of the horizontal and vertical frames when attached to the vehicle. A hitch connection is provided at the lower end of the lower base unit 100. The lower base unit 100 serves as the vertical support frame for the upper base unit 200. The upper base unit 200 is cantilevered over the vehicle 800 to provide an elevated rack system above the roof of the vehicle 800.

During installation and use, as illustrated most clearly in FIGS. 23-29, the lower base unit 100 is assembled. First, the center-post adjustment sleeve 300 is slid over the hitch beam vertical support 120 so that the handle 340 faces rearward (the opposite side of where these lower base unit 100 is attached to the trailer hitch 810 of the vehicle 800). A hitch pin, such as, for example, a ⅝ inch diameter each pin, is temporarily placed within the hitch pin holder 118 of the lower base unit 100.

Next, the first end 112 of the hitch beam 100 and is inserted into the vehicle tow hitch receiver tube 810. The lower base unit 100 is urged forward into position so that the hitch beam vertical support 120 is in contact with the spare tire 820 (if included). Once positioned, the hitch pin hole of the tow hitch receiver tube 810 is aligned with the appropriate hitch beam aperture 116 and the hitch pin is removed from the hitch pin holder 118 and inserted through the trailer hitch 810 to secure the lower base unit 100 to the trailer hitch 810.

Next, the center-point adjustable sleeve 300 is positioned about the hitch beam vertical support 120 and aligned with spare tire 820 in a manner that will facilitate the strap entry through the wheel of the spare tire 810. One or more pins or bolts 600 (such as, for example, to ⅜ inch diameter by 2¾ inch length bolts) are used to secure the center-point adjustable sleeve 300 to the hitch beam vertical support 120, via alignment and interaction of the hitch beam vertical support apertures 126 and the sleeve apertures 316.

Then, a cam strap (not shown) is inserted through an adjustment plate aperture 335 and the cam strap is pulled until the cam strap buckle pad prevents any further movement of the cam strap. The cam strap is then inserted through a first opening in the wheel of the spare tire 820 and back out through a second opening in the wheel of the spare tire 820 and through the adjustment plate aperture 335. The cam strap is then positioned through the cam strap buckle and pulled tight. By utilizing the cam strap in conjunction with the adjustment plate aperture(s) 335, the amount of forward and aft movement of the rack system 500 is limited.

Once the lower base unit 100 has been assembled, the upper base unit 200 is assembled. The upper base unit 200 is assembled by attaching one or more crossbars 410 to the support beam 210 by sliding the crossbar sleeve 240 into a desired position along the support beam 210. One or more pins or bolts 600 (such as, for example, to ⅜ inch diameter by 2½ inch length bolts) are used to secure each crossbar sleeve 420 to the support beam 210. It should be appreciated that while the rack system 500 is shown and described as including to crossbars 410 position along the support beam 210, the number and placement of crossbars 410 is a design choice based upon the desired functionality of the rack system 500.

Once the desired number of crossbars 410 are positioned along the upper base unit 200, the support beam vertical support 220 of the upper base unit 200 is at least partially inserted within the hitch beam vertical support 120. The support beam vertical support 220 is inserted within the hitch beam vertical support 120, such that the support beam 210 is approximately 2" above the roofline of the vehicle 800.

In various exemplary embodiments, the support beam vertical support 220 is secured in place relative to the hitch beam vertical support 120 using one or more pins or bolts 600 (such as, for example, to ⅜ inch diameter by 2½ inch length bolts). A first pin or bolt 600 may be placed through a hitch beam vertical support aperture 126 at the top of the hitch beam vertical support 120 where the support beam vertical support 220 enters the hitch beam vertical support 120, while a second pin or bolt 600 may be placed through a lower hitch beam vertical support aperture 126, for a more stable connection.

Once the rack system 500 is installed on the vehicle 800, the support straps 700 can be attached to the loops 240 by use of an "S" hook or similar device at the ends of a strap 700. This can be accomplished by inserting an "S" hook at the cam buckle end of a strap 700 into the loop 240 on each side of the upper base unit 200. Then, the "S" hook of the running end of each strap 700 is inserted into an attaching point under the rear bumper (the bumper braces on each side) of the vehicle 800. Next, the running end of the strap 700 is slid into the cam buckle and pull tightly. An appropriate amount of attention is placed on each side of the rack system 500 so that the rack system 500 is straight and level (not leaning to one side).

It should be appreciated that the rack system 500 can be removed from the vehicle 800 by performing the steps in reverse.

Figure 30:
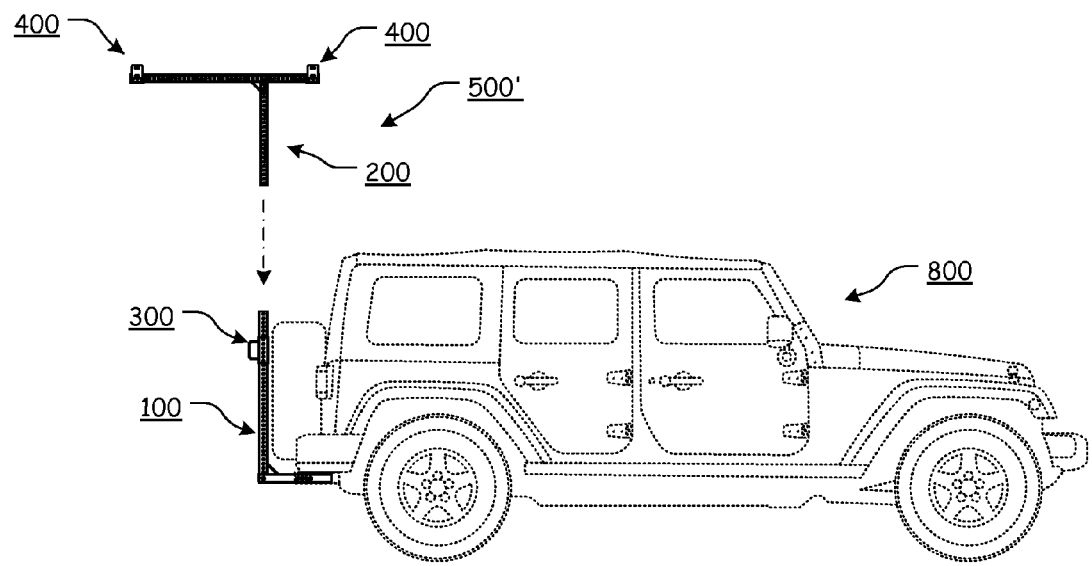
FIG. 30 illustrates a side view of the rack system of an exemplary embodiment of the hitch mounted rack system being installed on an exemplary vehicle in accordance with an alternate installation embodiment, according to this invention.
Figure 31:
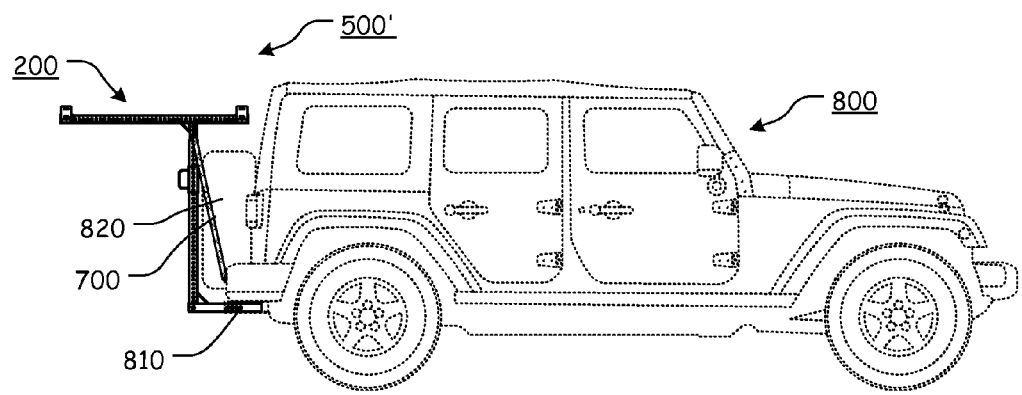
FIG. 31 illustrates a side view of the rack system of an exemplary embodiment of the hitch mounted rack system installed on an exemplary vehicle in accordance with an alternate installation embodiment, according to this invention.

FIGS. 30-31 illustrate a second exemplary configuration of the hitch mounted rack system, according to this invention. As illustrated in FIGS. 30-31, the hitch mounted rack system 500' comprises the lower base unit 100, the upper base unit 200, the center-point adjustable sleeve 300, the crossbar assemblies 400, and the support straps 700.

However, as further illustrated in FIGS. 30-31, the upper base unit 200 is inserted into the lower base unit 100 such that the cantilever of the upper base unit 200 is facing rearward (instead of over the roofline of the vehicle 800) and lowered to a position just above the spare tire 820. This configuration allows for various gear baskets or other items to be added and be accessible to the driver.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary, non-limiting embodiments for various applications without departing from the spirit and scope of the invention and elements or methods similar or equivalent to those described herein can be used in practicing the present invention. Any and all such changes, variations, modifications, and/or adaptations should and are intended to be comprehended within the meaning and range of equivalents of the disclosed exemplary embodiments and may be substituted without departing from the true spirit and scope of the invention.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A hitch mounted rack system, comprising:
   a lower base unit, wherein said lower base unit includes an elongate hitch beam and an elongate hitch beam vertical support extending from said hitch beam, wherein a longitudinal axis of said hitch beam is substantially perpendicular to a longitudinal axis of said hitch beam vertical support, and wherein said hitch beam vertical support includes a plurality of hitch beam vertical support apertures formed therethrough;
   an upper base unit, wherein said upper base unit includes an elongate support beam and an elongate support beam vertical support extending from said support beam, wherein a longitudinal axis of said support beam is substantially perpendicular to a longitudinal axis of said support beam vertical support, wherein said support beam vertical support includes a plurality of support beam vertical support apertures formed therethrough, and wherein said support beam vertical support is at least partially received within at least a portion of said hitch beam vertical support such that said longitudinal axis of said support beam is substantially coplanar with said longitudinal axis of said hitch beam and such that at least a portion of said support beam vertical support is adjustably slidable within at least a portion of said hitch beam vertical support;
   one or more attachment loops for support straps attached or coupled to opposing sides of said support beam vertical support;
   a center-point adjustable sleeve, wherein said center-point adjustable sleeve includes a sleeve having a plurality of sleeve apertures formed therethrough, such that at least certain of said sleeve apertures are allignable with certain of said hitch beam vertical support apertures and certain of said support beam vertical support apertures so as to allow a position of said sleeve to be adjusted in relation to said hitch beam vertical support and said support beam vertical support and maintained in a desired position when one or more pins or bolts is positioned through aligned, corresponding sleeve apertures, hitch beam vertical support apertures, and support beam vertical support apertures;
   one or more crossbar assemblies, wherein each crossbar assembly comprises a crossbar sleeve attached or coupled to a crossbar, wherein a longitudinal axis of said crossbar sleeve is perpendicular to a longitudinal axis of said crossbar, wherein said crossbar sleeve comprises a portion of material sized so as to be slidable along at least a portion of said support beam, and wherein a plurality of crossbar sleeve apertures are formed through said crossbar sleeve such that at least certain of said crossbar sleeve apertures can be aligned with at least certain of said support beam apertures; and
   support straps attachable between said attachment loops and said vehicle to limit movement of said hitch mounted rack system.

2. The hitch mounted rack system of claim 1, further comprising a hitch beam reinforcing corner attached or coupled so as to join at least a portion of said hitch beam to said hitch beam vertical support.

3. The hitch mounted rack system of claim 1, wherein said hitch beam comprises a portion of square, tubular material sized so as to be at least partially received within a vehicle tow hitch receiver tube.

4. The hitch mounted rack system of claim 1, wherein at least a portion of a first end of said hitch beam comprises a portion of square, tubular material sized so as to be at least partially received within a vehicle tow hitch receiver tube.

5. The hitch mounted rack system of claim 1, further comprising at least one hitch beam aperture formed through said hitch beam.

6. The hitch mounted rack system of claim 1, wherein said hitch beam vertical support comprises a portion of square, tubular material of a similar size to that of said hitch beam.

7. The hitch mounted rack system of claim 1, wherein a longitudinal axis of each hitch beam vertical support aperture is perpendicular to a longitudinal axis of said hitch beam vertical support.

8. The hitch mounted rack system of claim 1, wherein a first end of said hitch beam vertical support is permanently attached or coupled to said hitch beam proximate a second end of said hitch beam.

9. The hitch mounted rack system of claim 1, further comprising a support beam reinforcing corner attached or coupled so as to join at least a portion of said support beam to said support beam vertical support.

10. The hitch mounted rack system of claim 1, wherein said support beam vertical support comprises a portion of square, tubular material sized so as to be at least partially received within at least a portion of said hitch beam vertical support.

11. The hitch mounted rack system of claim 1, wherein a longitudinal axis of each support beam vertical support aperture is perpendicular to a longitudinal axis of said support beam vertical support.

12. The hitch mounted rack system of claim 1, wherein said sleeve comprises a portion of square, tubular material sized so as to receive at least a portion of said hitch beam vertical support within said sleeve, such that said sleeve is slidable along at least a portion of said hitch beam vertical support.

13. The hitch mounted rack system of claim 1, wherein said center-point adjustable sleeve further comprises an adjustment plate permanently attached or coupled to said sleeve.

14. The hitch mounted rack system of claim 13, wherein said adjustment plate comprises a first adjustment plate aperture formed therethrough proximate said first end and a second adjustment plate aperture formed therethrough proximate said second end.

15. The hitch mounted rack system of claim 1, wherein said center-point adjustable sleeve further comprises a handle.

16. The hitch mounted rack system of claim 1, wherein a position of each crossbar sleeve can be adjusted in relation to said support beam and maintained in a desired position relative to said support beam when one or more pins or bolts is positioned through aligned, corresponding crossbar sleeve apertures and support beam apertures.

17. The hitch mounted rack system of claim 1, wherein a crossbar end plate is permanently attached or coupled to each end of said crossbar.

18. The hitch mounted rack system of claim 17, wherein each crossbar end plate includes at least one crossbar plate aperture formed therethrough.

19. A hitch mounted rack system, comprising:
a lower base unit, wherein said lower base unit includes an elongate hitch beam and an elongate hitch beam vertical support extending from said hitch beam, wherein a longitudinal axis of said hitch beam is substantially perpendicular to a longitudinal axis of said hitch beam vertical support, and wherein said hitch beam vertical support includes a plurality of hitch beam vertical support apertures formed therethrough;
an upper base unit, wherein said upper base unit includes an elongate support beam and an elongate support beam vertical support extending from said support beam, wherein a longitudinal axis of said support beam is substantially perpendicular to a longitudinal axis of said support beam vertical support, wherein said support beam vertical support includes a plurality of support beam vertical support apertures formed therethrough, and wherein said support beam vertical support is at least partially received within at least a portion of said hitch beam vertical support such that said longitudinal axis of said support beam is substantially coplanar with said longitudinal axis of said hitch beam;
a center-point adjustable sleeve, wherein said center-point adjustable sleeve includes a sleeve having a plurality of sleeve apertures formed therethrough, such that at least certain of said sleeve apertures are allignable with certain of said hitch beam vertical support apertures and certain of said support beam vertical support apertures so as to allow a position of said sleeve to be adjusted in relation to said hitch beam vertical support and said support beam vertical support and maintained in a desired position when one or more pins or bolts is positioned through aligned, corresponding sleeve apertures, hitch beam vertical support apertures, and support beam vertical support apertures; and
one or more crossbar assemblies, wherein each crossbar assembly comprises a crossbar sleeve attached or coupled to a crossbar, wherein a longitudinal axis of said crossbar sleeve is perpendicular to a longitudinal axis of said crossbar, wherein said crossbar sleeve comprises a portion of material sized so as to be slidable along at least a portion of said support beam, and wherein a plurality of crossbar sleeve apertures are formed through said crossbar sleeve such that at least certain of said crossbar sleeve apertures can be aligned with at least certain of said support beam apertures.

* * * * *